United States Patent
Kirkpatrick

[11] 3,951,053
[45] Apr. 20, 1976

[54] PIE CRUST PROTECTOR

[75] Inventor: Margaret A. Kirkpatrick, Kelseyville, Calif.

[73] Assignee: The Raymond Lee Organization, Inc., New York, N.Y.

[22] Filed: June 21, 1974

[21] Appl. No.: 481,688

[52] U.S. Cl.............................. 99/433; 99/DIG 15
[51] Int. Cl.² .......................................... A21B 3/13
[58] Field of Search............... 99/433, 432, DIG 15; 126/383

[56] References Cited
UNITED STATES PATENTS

| | | | |
|---|---|---|---|
| 1,180,782 | 4/1916 | McLaughlin | 99/433 |
| 1,375,539 | 4/1921 | Scott | 99/433 X |
| 1,420,466 | 6/1922 | Bakken | 99/433 |
| 1,827,062 | 10/1931 | Austin | 99/433 |
| 2,257,408 | 9/1941 | Alexander | 99/433 |
| 2,288,795 | 7/1942 | Earl | 99/433 UX |
| 2,784,664 | 3/1957 | Tippel | 99/433 |

Primary Examiner—Stanley N. Gilreath
Assistant Examiner—Arthur O. Henderson
Attorney, Agent, or Firm—Howard I. Podell

[57] ABSTRACT

A pie crust lip protector device composed of a heat reflecting material for protecting the lip of the crust of a pie from burning during baking. The lip protector device is composed of a flat ring member formed with a circular recess for fitting over the lip of the crust of a pie that rests on the circular rim of a pie plate.

1 Claim, 4 Drawing Figures

U.S. Patent    April 20, 1976    3,951,053
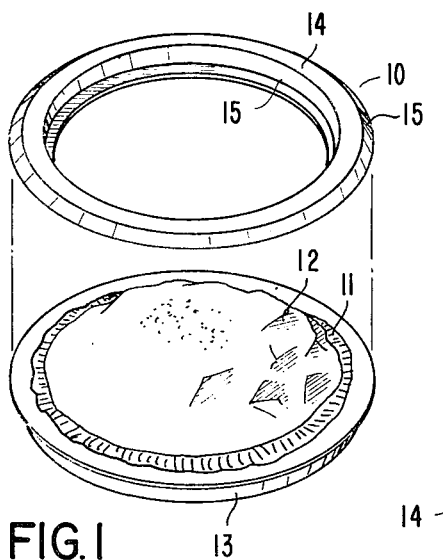
FIG.1
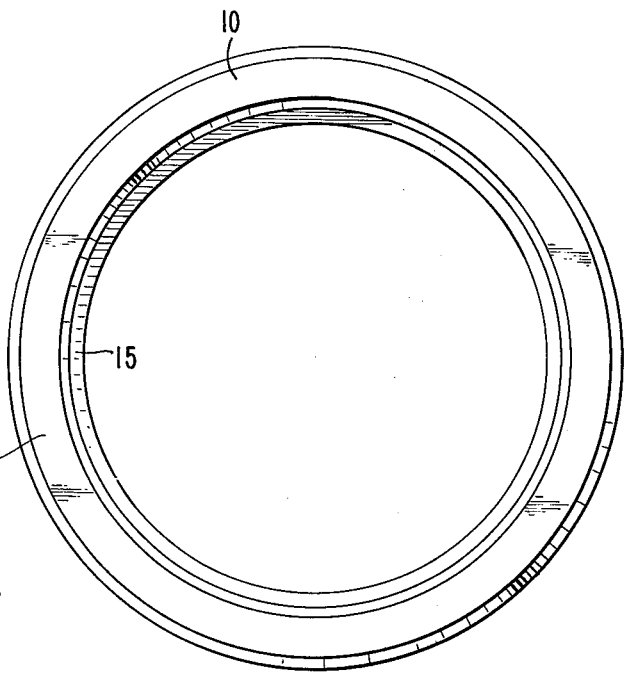
FIG.2
FIG.3
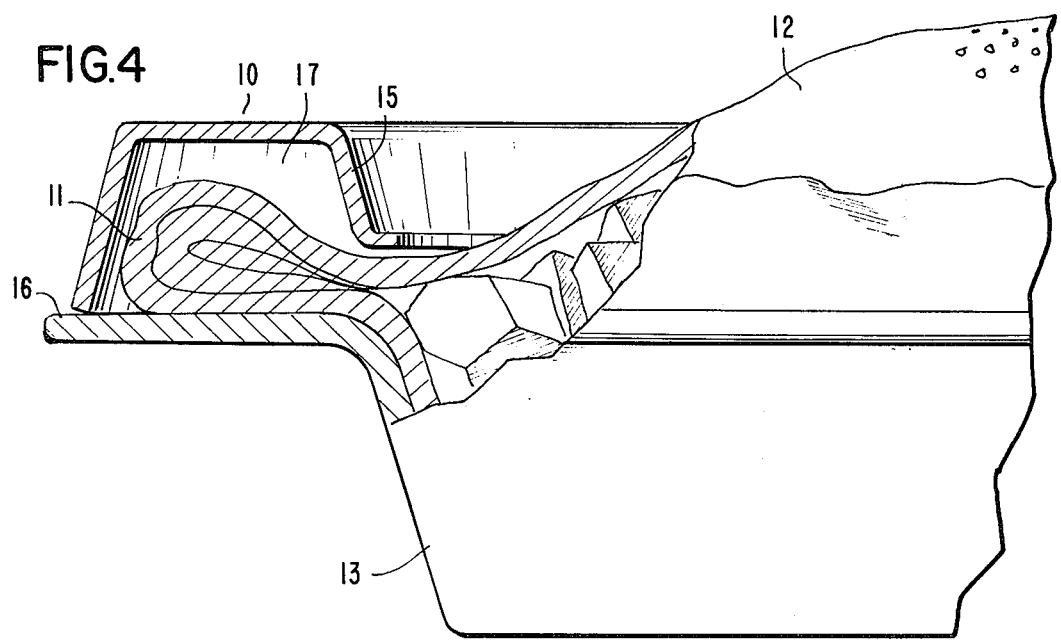
FIG.4

PIE CRUST PROTECTOR

SUMMARY OF THE INVENTION

My invention relates to a pie crust lip protector device formed of a heat reflecting material for protecting the lip of the crust of a pie from burning during baking.

The lip protector device is composed of a flat circular ring member that rests on the lip of the crust of a pie lying on the rim flange of a pie plate.

The device is formed with a circular recess on its bottom surface for enclosing the lip of the pie crust.

BRIEF DESCRIPTION OF THE DRAWING

The objects and features of the invention may be understood with reference to the following detailed description of an illustrative embodiment of the invention, taken together with the accompanying drawings in which:

FIG. 1 illustrates an exploded perspective view of the invention in use;

FIG. 2 illustrates a bottom plan view of the invention;

FIG. 3 illustrates a side view of the invention; and

FIG. 4 illustrates a fragmentary side sectional view of the invention in use.

DESCRIPTION OF THE PREFERRED EMBODIMENT

Turning now descriptively to the drawings, in which similar reference characters denote similar elements throughout the several views, FIGS. 1–4 show a pie crust lip protector device 10 which fits over the circular lip 11 of a crust of a pie 12 which is baked in an open plate 13 fitted with a flat peripheral flange 16 on which the crust lip 11 lies.

The device 10 is in the form of a circular ring of heat reflective material, fitted with an open circular recess 17 on its bottom surface so that the device extends above and around the lip 11 of the pie 12.

The device 10 permits the baking of a pie without burning the lip of the crust and may be repeatedly used, or formed of a disposable material.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A circular pie plate and a device for protecting the lip of a crust of a pie in the pie plate from burning during the baking process of the pie, said pie plate formed with a flange that extends about the top periphery of the plate in a plane parallel to the bottom of the plate, said device comprising a shaped ring formed of heat reflective material, with the outer diameter of said rim of less magnitude than the outer diameter of the flange of the pie plate so as to rest on the flange in the installed position, and with said ring formed with a continuous recess in its under surface to fit about the lip of a pie crust also resting on the said flange in the installed position.

* * * * *